Sept. 19, 1944. G. B. PACE 2,358,495
EXCAVATING APPARATUS
Filed March 31, 1942 2 Sheets-Sheet 1
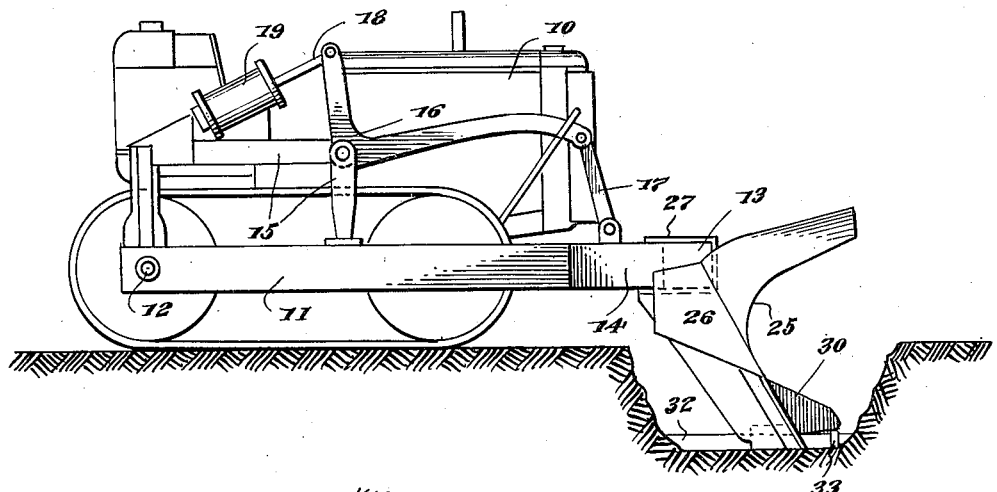
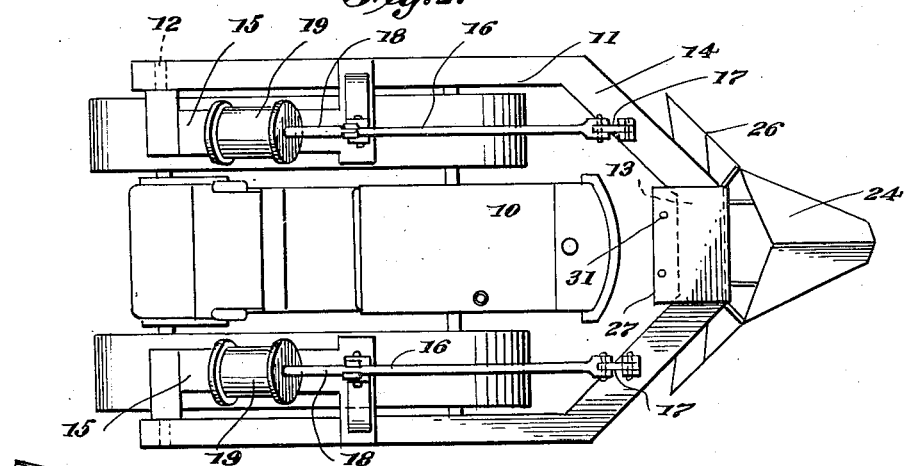
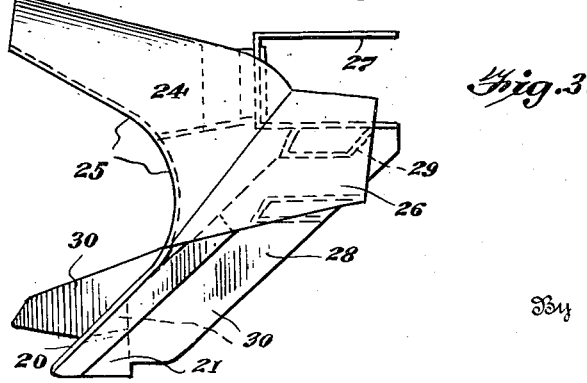
Inventor
GARLAND B. PACE
Attorney Sept. 19, 1944.   G. B. PACE   2,358,495
EXCAVATING APPARATUS
Filed March 31, 1942   2 Sheets-Sheet 2
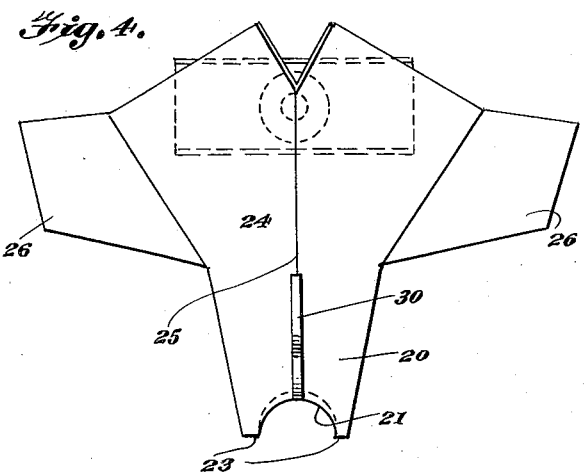
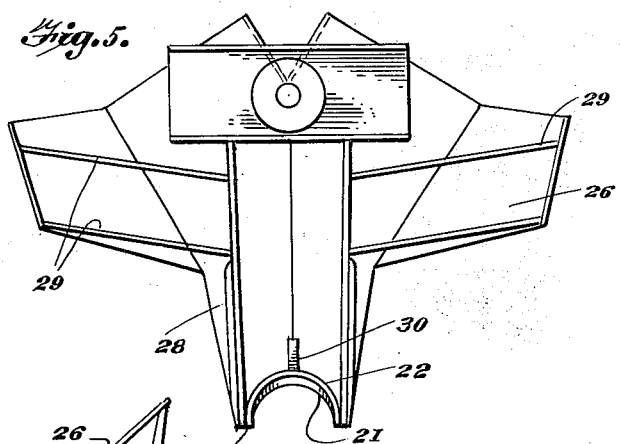
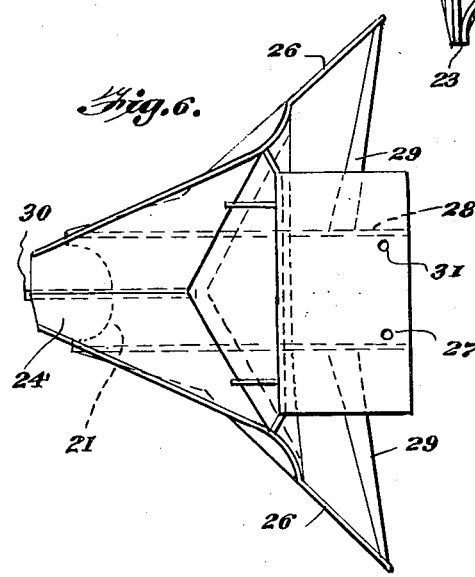
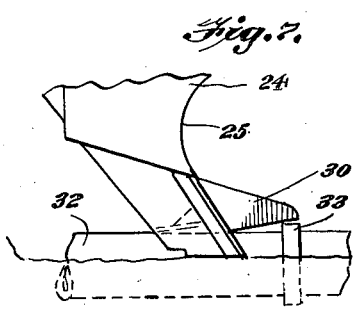
Inventor
GARLAND B. PACE Patented Sept. 19, 1944

2,358,495

UNITED STATES PATENT OFFICE 2,358,495

EXCAVATING APPARATUS

Garland B. Pace, Camp Hill, Pa., assignor to Exeter Construction Corporation, Camp Hill, Pa.

Application March 31, 1942, Serial No. 437,051

15 Claims. (Cl. 37—98)

The present invention relates to improvements in excavating apparatus and more particularly to a mechanism for uncovering pipe or the like buried beneath the surface of the ground.

An important object of the invention is the provision of an excavating apparatus which will excavate the soil surrounding pipe embedded in the ground and leave the pipe in an exposed position and capable of being easily removed from the ground.

Another object of the invention is to provide an apparatus of this character which will form a trench exposing the pipe and which will move the excavated soil out of the trench and deposit it to the side of the trench.

A further object of the invention is the provision of a device of this character which will not damage the pipe or the pipe flanges.

Still another object of the invention is to provide a device of this character which may be readily attached to a tractor or the like.

Other objects and advantages of the invention will be apparent during the course of the following description.

In the accompanying drawings, which form a part of this specification and wherein like characters of reference denote like parts throughout, Figure 1 is a side elevation of an apparatus embodying the invention applied to a tractor and disposed in position for excavating;

Figure 2 is a top plan view thereof;

Figure 3 is a side elevational view of the excavating device before attachment to the tractor or other vehicle;

Figure 4 is a front elevation thereof;

Figure 5 is a rear elevation of the device;

Figure 6 is a top plan view thereof, and

Figure 7 is a detail view illustrating the operation of the kicker or cam lifting portion of the device.

In the drawings, wherein for the purpose of illustration is shown a preferred embodiment of the invention, the numeral 10 designates a tractor or other vehicle for carrying the device and having a generally U-shaped frame 11 pivoted at 12 to the tractor 10 in line with the rear driving axle or shaft thereof. The frame 11 extends in a substantial normally horizontal position from the rear of the tractor to a point in front of the tractor in a line substantially midway between the upper and lower runs of the endless tread. The forward portion of the frame 11 comprises a relatively short cross-piece 13 spaced in front of the tractor and connected to the side arms of the frame 11 by means of inclined portions 14.

Each side of the tractor frame carries a support 15 adjacent its rearward end. A bell-crank lever 16 is pivoted to the forward upper portion of each support 15 and is disposed with its long arm extending longitudinally forward in a generally horizontal direction above the tractor tread and with its short arm extending substantially vertically upwardly from support 15. The forward portion of each long arm of each bell-crank is pivotally connected by a link 17 with the inclined forward portions 14 of the frame 11. The upper end of the short arm of each bell-crank 16 is pivotally connected to a piston rod 18 extending into a hydraulic cylinder 19 carried by the support 15 adjacent its rearward portion. The rod 18 is connected to a piston within the cylinder 19 in the usual manner. It will be seen that when the rods 18 are forced outwardly of the cylinders 19, the bell-cranks 16 act through links 17 to forcibly lower the frame 11 about its pivot 12 and that when the rod 18 is drawn into the cylinder 19, the bell-crank 16 will raise the forward end of frame 11 about its pivot 12.

The excavating device of the present invention is adapted to be detachably secured to the cross-piece 13 on the forward portion of the frame 11 to be raised and lowered therewith. The excavating device may obviously be connected to bull-dozer frames, angle-dozer frames or supported in any desired manner upon a tractor or any other suitable vehicle. It is preferred to support the excavating device in front of the tractor, centrally thereof as shown in Figures 1 and 2, but if desired it can be carried behind the tractor to be drawn thereby, or at the sides of the tractor.

The excavating device of this invention comprises a flat surfaced excavating or plow blade 20 disposed at an angle of about 45° with a horizontal plane in its operative position and formed of some suitable material such as steel. The blade 20 has a width at its lower end slightly greater than the diameter of the pipe to be uncovered and its width progressively increases from its bottom upwardly. The bottom of the blade 20 is provided with a central semi-circular opening 21 slightly larger in diameter than the external diameter of the pipe to be uncovered. A semi-circular flange 22 extends rearwardly from the opening 21 and is adapted to rest upon the top of the pipe in its operative position. Relatively narrow points 23 are thus formed at each side of the opening 21 for a purpose to be described later.

A spreader wedge 24 extends from the top of the blade 20 to a point below its middle. The wedge 24 is substantially V-shaped in section and projects forwardly from the face of the blade. The two converging walls of the wedge gradually merge into the flat surface of the blade 20 at a point spaced a substantial distance from the bottom of the blade. The corner 25 of the V-wedge curves upwardly and forwardly away from the forward surface of blade 20 and at its top projects forwardly of the bottom of the blade, as seen in Figures 3 and 6. The wedge 24 may be separately formed and attached to the blade 20 or may be integral therewith. However, the surface of blade 20 below the spreading wedge is flat so as to force the excavated soil upwardly. The wedge 24 is designed to spread the soil as it rises above the trench and to deposit it at the sides of the trench. In order to move the soil safely past the edges of the trench and out of the path of the tractor, rearwardly and outwardly inclined wings 26 are provided at the sides of the wedge 24 preferably terminating at the point where the wedge joins the blade 20. The lower edges of the wings 26 are preferably inclined upwardly away from the blade 20.

An attaching clamp 27 is substantially C-shaped in cross section and has its rear wall rigidly secured to the rear of the spreading wedge adjacent the top thereof.

Suitable parallel, longitudinal bracing ribs 28 are secured at their edges to the rear of the blade 20 and wedge 24 and extend from points 23 to the bottom wall of clamp 27 to which they are secured. Lateral braces 29 connect the ribs 28 with the wings adjacent the outer edges of the wings. The ribs 28 and braces 29 may be welded in position or secured in any other suitable manner.

A cam or kicker member 30 is secured to the lower face of the blade 20, centrally thereof and may have a tenon extending through a slot in the blade to brace it in position. The cam 30 extends vertically from the top of opening 21 to a point adjacent the bottom of the wedge and projects forwardly a substantial distance from the front of blade 20, preferably terminating in a rounded point. The lower edge of cam member 30 is inclined upwardly from the blade 20 to its forward point.

In practice, the clamp 27 is passed over the cross-bar 13 of the tractor frame 11 and detachably fastened thereto by bolts 31. With the excavating device thus mounted, the required number of passes are made therewith to uncover the pipe 32 and when it comes into contact with the pipe, the opening 21 in blade 20 receives the pipe and the flange 22 rests upon the surface of the pipe. This operative position of the device is illustrated in Figure 1. When the tractor or other power vehicle is moved forwardly, the blade 20 remains in contact with the pipe and is pushed forwardly into the soil covering the pipe. Due to the angle and shape of the blade 20, the soil will be plowed up to uncover the pipe 32 by digging a trench over the pipe. The soil plowed up by blade 20 will pass up the blade, due to its flat surface, and will then be engaged by the spreader wedge 24 and guided to either side of the trench. The wings 26 will pass the soil laterally away from the sides of the trench and out of the path of the tractor 10.

The angle of the blade 20 is such that the blade has a tendency to draw itself into the ground and the movement of the soil up the blade also serves to force it into the ground. By using the blade 20 in the manner of a plow, it can start from the surface and dig down to the pipe, and then move along the pipe to uncover the same.

Referring to Figure 1, it will be seen that the lower portion of the wedge 24 is disposed at substantially the ground level so that the soil is first raised vertically to the ground level and is then spread laterally by the wedge 24 and wings 26 to be deposited on the ground at the sides of the trench and out of the path of the tractor. Due to the forward extension of the upper portion of the wedge 24, the soil cannot pass over the top of the excavating device but will always be engaged by the wedge and guided laterally away from the trench.

An important feature of this invention is the use of the kicker element 30 for lifting the device over the flange collars on the pipe. As indicated in Figures 1 and 7, the forward portion of the kicker or cam element 30 is disposed above the top of the flange collar 33 on the pipe 32. As the excavating device is moved forwardly, the inclined cam surface at the bottom of member 30 rides up onto the collar 33, thereby lifting the blade 20 upwardly to pass over the collar 33 without being obstructed thereby. As soon as the blade 20 and flange 22 clears the collar 33, it will again come to rest upon the surface of pipe 32.

The blade 20 will dig a trench of the shape of the blade best seen in Figure 4, and will uncover the upper half of the pipe. The trench thus formed will have downwardly converging walls. The two points 23 at the sides of opening 21 will clear away the soil at the sides of the pipe and permit insertion of the fingers or a tool for removing the pipe from the trench.

The cam element 30 will lift the blade 20 the very short distance necessary to pass it over the flange collars 33 on the pipe. This movement of the blade will be permitted by the hydraulic mechanism, as the hydraulic pump will be in neutral position permitting movement in either direction.

When the excavating device has completed its work, it may be detached from the frame 11 and the tractor used for other work by attaching a bull-dozer blade, angle-dozer blade or other implement to the frame 11.

It will be seen that the excavator of this invention may be carried and operated by any suitable mechanism. The tractor 10 and hydraulically operated frame 11 is merely illustrative of one method of carrying and operating the excavating device.

While the invention is primarily designed for uncovering pipe, it may also be used to dig trenches for new pipe locations or for drainage or other purposes.

Another advantage of the device of this invention is that it may be used to build its own right-of-way in hilly country or on steep hillsides. By first digging a trench on the high side of the pipe by means of blade 20, the upper tread of the tractor can then operate within such trench to level the tractor when the pipe uncovering operation is underway.

Having thus described the invention, what is claimed is:

1. In an excavating device to uncover pipe disposed below the surface of the ground, an excavating blade inclined at an angle to a horizontal plane and having a substantially arcuate opening in its lower end to engage the surface of the pipe, a spreader wedge carried by said blade at a point spaced a substantial distance from the lower end of the blade, means to force the blade through the ground and along the pipe, and means carried by the blade to engage the pipe joints ahead of the blade and raise the blade over said pipe joints.

2. In an excavating device to uncover pipe disposed below the surface of the ground, an excavating blade inclined at an angle to a horizontal plane and having a substantially arcuate opening in its lower end to engage the surface of the pipe, a spreader wedge carried by said blade at a point spaced a substantial distance from the lower end of the blade, means to force the blade through the ground and along the pipe, said wedge extending upwardly and forwardly from said blade to engage soil forced up the inclined surface of the blade and to guide it laterally away from the blade, and means carried by the blade to engage the joints of the pipe ahead of the blade and raise the blade over said pipe joints.

3. In an excavating device to uncover pipe disposed below the surface of the ground, a flat surfaced excavating blade inclined at an angle to a horizontal plane and having a substantially arcuate opening in its lower edge to engage the upper surface of the pipe, a spreader spaced a substantial distance above the lower end of the blade and having guide surfaces to engage soil raised by the blade and to guide said soil laterally away from the blade, and a kicker member carried by said blade above said opening in its lower end and projecting forwardly from the leading face of the blade, said kicker having an inclined lower surface to engage the joints on the pipe and raise the blade thereover.

4. The combination with a tractor having a forwardly projecting frame and means to raise and lower said frame, of an excavating device to uncover pipe disposed below the surface of the ground comprising an excavating blade having a substantially flat surface inclined at an angle to a horizontal plane, the lower edge of said blade being curved to engage the rounded surface of the pipe, and a spreader carried by the blade at a point spaced a substantial distance from the lower end of the blade and adapted to engage the soil forced up the inclined surface of the blade and to guide it laterally away from the blade, and wings carried by the spreader and extending rearwardly at an angle to guide the excavated soil out of the path of the tractor.

5. In an excavating device to uncover pipe disposed below the surface of the ground, a flat surfaced excavating blade inclined at an angle to a horizontal plane and having a substantially arcuate opening in its lower edge to engage the upper surface of the pipe, a spreader spaced a substantial distance above the lower end of the blade and having guide surfaces to engage soil raised by the blade and to guide said soil laterally away from the blade, and wings disposed at each side of the spreader and inclined outwardly and rearwardly of the spreader to displace the excavated soil.

6. In an excavating device to uncover pipe disposed below the surface of the ground, a flat surfaced excavating blade inclined at an angle to a horizontal plane and having a substantially arcuate opening in its lower edge to engage the upper surface of the pipe, and a spreader spaced a substantial distance above the lower end of the blade and having guide surfaces to engage soil raised by the blade and to guide said soil laterally away from the blade, wings disposed at each side of the spreader and inclined outwardly and rearwardly of the spreader to displace the excavated soil, a clamp secured to said spreader at the rear thereof, and reinforcing braces connecting the rear surfaces of the clamp, blade and wings.

7. In a device of the character described, an excavating blade movable horizontally, means on said blade to displace soil vertically for forming a trench, means carried by said blade to engage the displaced soil above the level of the trench formed by the blade and to guide it laterally away from said blade and trench, and means disposed ahead of said blade and provided with a cam surface to engage obstructions ahead of the blade and to raise the blade above such obstructions.

8. In a device of the character described, an excavating blade movable horizontally, means associated with said blade to displace soil excavated by the blade to form a trench, and means carried by the blade and including a cam surface to engage obstructions in the path of the blade and to raise the blade above such obstructions.

9. In an excavating device to uncover pipe disposed below the surface of the ground, an excavating blade movable horizontally to form a trench above said pipe, means carried by the blade to engage and ride upon the pipe, and means operatively associated with said blade to engage pipe joints and elevate the blade over said joints.

10. In an excavating device to uncover pipe disposed below the surface of the ground, an excavating blade movable to form a trench above the pipe, said blade having a pipe-engaging surface, and a kicker element associated with the pipe-engaging surface of the blade and having an inclined surface to engage the joints on the pipe and raise the blade thereover.

11. In a pipe line plow, the combination with a self-propelled power vehicle having supporting traction devices arranged to be disposed on opposite sides of a buried pipe line, of a plow constructed to form a furrow over the pipe line upon movement therealong, means mounting the plow on the vehicle for yielding movement in an upward direction relative thereto in response to deviations in the surface of the pipe line, and means forming a guiding relation between the pipe line and plow and constructed for guiding the plow over obstructions on the upper surface of the pipe line by lifting of the plow relative to pipe line surface, said guiding means being constructed for embracing the upper portion of the pipe line and having a forwardly inclined under surface in position to ride over said obstructions.

12. In a pipe line plow, the combination with a self-propelled power vehicle having supporting traction devices arranged to be disposed on opposite sides of a buried pipe line, of a plow constructed to form a furrow over the pipe line upon movement therealong, means mounting the plow on the vehicle for yielding movement in an upward direction relative thereto in response to deviations in the surface of the pipe line, and means forming a guiding relation between the pipe line and plow and constructed for guiding the plow over obstructions on the upper surface of the pipe line by lifting of the plow relative to pipe line surface.

13. In a pipe line plow, the combination with motion imparting means, of a double-moldboard plow for forming a furrow over the pipe line upon movement therealong, means connecting the plow to the motion imparting means for yielding movement relative thereto in response to deviations in the surface of the pipe line, and means forming a guiding relation between the pipe line and plow and constructed for guiding the plow over obstructions on the upper surface of the pipe line by lifting of the plow relative to the pipe line surface.

14. In a pipe line plow, the combination with motion imparting means, of a double-moldboard plow for forming a furrow over the pipe line upon movement therealong, means connecting the plow to the motion imparting means for yielding movement relative thereto in response to deviations in the surface of the pipe line, means forming a guiding relation between the pipe line and plow and constructed for guiding the plow over obstructions on the upper surface of the pipe line by lifting of the plow relative to the pipe line surface, and means carried by said plow for stripping the soil from opposite sides of the pipe line.

15. A pipe line plow comprising a ground breaking member, rearwardly diverging moldboards operatively associated therewith for directing the broken ground rearwardly and laterally, means on said plow for guiding the same along a pipe line, and means on said plow for engaging obstructions on the surface of the pipe line and guiding the plow thereover.

GARLAND B. PACE.